United States Patent [19]
Davey et al.

[11] Patent Number: 5,544,481
[45] Date of Patent: Aug. 13, 1996

[54] ENGINE AIR/FUEL CONTROL SYSTEM AND CATALYTIC CONVERTER MONITORING

[75] Inventors: Christopher K. Davey, Farmington Hills; Donald F. Dickison, Sterling Heights; Robert J. Jerger, Livonia, all of Mich.

[73] Assignee: Ford Motor Company, Dearborn, Mich.

[21] Appl. No.: 414,569

[22] Filed: Mar. 31, 1995

[51] Int. Cl.⁶ ........................................ F01N 3/10
[52] U.S. Cl. ........................ 60/274; 60/277; 60/285
[58] Field of Search ...................... 60/274, 277, 285

[56] References Cited

U.S. PATENT DOCUMENTS

| | | | |
|---|---|---|---|
| 5,272,872 | 12/1993 | Grutter et al. | 60/285 |
| 5,289,678 | 3/1994 | Grutter | 60/285 |
| 5,337,556 | 8/1994 | Aihara | 60/277 |
| 5,357,751 | 10/1994 | Orzel | 60/277 |
| 5,385,016 | 1/1995 | Zimlich et al. | 60/274 |
| 5,386,693 | 2/1995 | Orzel | 60/277 |
| 5,396,875 | 3/1995 | Kotwicki et al. | 123/681 |

Primary Examiner—Leonard E. Heyman
Attorney, Agent, or Firm—Allan J. Lippa; Roger L. May

[57] ABSTRACT

An air/fuel control system (10) and method for an engine (28) coupled to a catalytic converter (50) includes monitoring of the converter (50). Engine air/fuel ratio is controlled (104–178) in response to a pair of two-state signals generated by comparing the outputs of respective upstream (44, 55) and downstream (52) exhaust gas oxygen sensors to a reference voltage. The transitions in the downstream sensor are indicated when a difference in its output amplitude changes signs and a difference between stored peak values occurring during two successive changes in the sign exceeds a predetermined value (200–350). Converter efficiency is indicated from a ratio of transitions in the downstream sensor transitions to transitions in the upstream sensor output which are generated in a similar manner (690–770).

15 Claims, 12 Drawing Sheets

ENGINE AIR/FUEL CONTROL SYSTEM AND CATALYTIC CONVERTER MONITORING

FIELD OF THE INVENTION

The invention relates to electronic engine controls for internal combustion engines. In particular, it relates to air/fuel control with catalytic converter monitoring.

BACKGROUND OF THE INVENTION

Engine air/fuel control systems are known in which fuel delivered to the engine is adjusted by output signals derived from exhaust gas oxygen sensors positioned both upstream and downstream of the catalytic converter. Each output signal is generated by comparing the voltage output of each sensor against a reference to generate a two-state signal.

It is also known to monitor the converter's efficiency by calculating a ratio in transitions of the downstream two-state signal to the upstream two-state signal. Such an approach is shown in U.S. Pat. No. 5,385,016.

The inventors herein have recognized numerous problems with the above approaches. For example, poor engine calibration, or peculiar mixing of the exhaust gases in the exhaust manifold, may cause the downstream sensor to be exposed to exhaust gases rich of stoichiometry. A comparison of the downstream sensor output to a reference voltage may not always be possible. Under such conditions, a transition in the sensor output may not be detected thereby reducing the accuracy of converter efficiency indications. Similar problems may occur when the peak-to-peak voltage output of the sensors becomes degraded.

SUMMARY OF THE INVENTION

An object of the invention herein is to provide catalytic converter efficiency indications from downstream and upstream exhaust gas oxygen sensors independently of the conventional two-state output signal provided from such sensors.

The above object is achieved, and problems of prior approaches overcome, by providing both a control system and a control method for an engine having its exhaust coupled to a catalytic converter. In one particular aspect of the invention, the control method comprises the steps of: delivering fuel to the engine in proportion to a fuel signal; adjusting the fuel signal with a feedback variable derived from a comparison of a reference amplitude to output amplitude of an upstream exhaust gas oxygen sensor positioned upstream of the converter; biasing the fuel signal in relation to a biasing signal derived from a comparison of a reference value to an output amplitude of a downstream exhaust gas oxygen sensor positioned downstream of the converter; generating a difference in amplitude of the downstream sensor output amplitude each sample period; storing downstream sensor output amplitude as a peak amplitude each sample period when the downstream sensor amplitude difference changes signs; indicating a downstream sensor transition when the downstream sensor difference changes signs and a difference between the stored peak value and the stored peak value stored during a previous change in the sign of the downstream sensor amplitude exceeds a predetermined value; and indicating converter efficiency from a ratio of transitions of the downstream to transitions of an upstream signal derived from the upstream sensor output amplitude.

An advantage of the above aspect of the invention is that exhaust gas oxygen sensor transitions are provided independently of the conventional sensor two-state signal. More accurate indications of converter efficiency are thereby provided than heretofore possible.

BRIEF DESCRIPTION OF THE DRAWINGS

The object and advantages of the invention described above will be more clearly understood by reading an example of an embodiment in which the invention is used to advantage with reference to the attached drawings wherein.

DESCRIPTION OF AN EMBODIMENT

Figure 1:
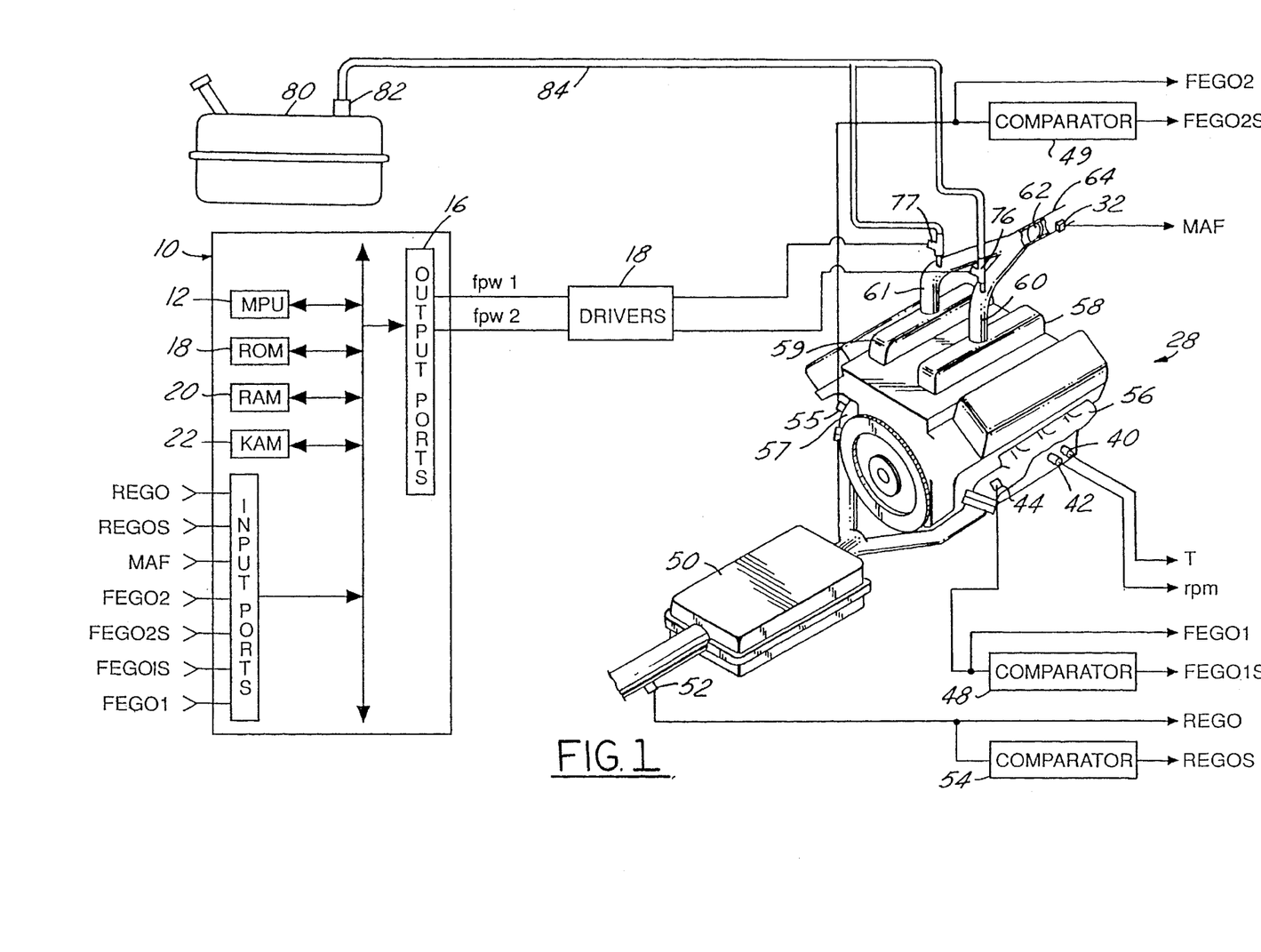
FIG. 1 is a block diagram of an embodiment wherein the invention is used to advantage.

Controller 10 is shown including a conventional microcomputer including: microprocessor unit 12; input ports 14; output ports 16; read only memory 18, for storing the controlled program; random access memory 20, for temporary data storage which may also be used for counters or timers; keep alive memory 22, for storing learned values; and a conventional data boss. Outputs are shown coupled to conventional electronic drivers 18.

Controller 10 is shown receiving various signals from sensors coupled to engine 28 including: measurement of inducted mass air flow (MAF) from air flow sensor 32, engine coolant temperature (T) from temperature sensor 40; and indication of engine speed (RPM) from tachometer 42.

Output signal FEGO1 is provided from conventional exhaust gas oxygen sensor 44 coupled to right hand exhaust manifold 56 which, in this particular example, is coupled to the right hand cylinder bank of a V-8 engine. Similarly, output signal FEGO2 is shown provided by conventional exhaust gas oxygen sensor 54 coupled to left hand exhaust manifold 57. Both signal FEGO1 and signal FEGO2 are compared to a respective reference value selected at the midpoint of the sensor's average peak-to-peak output in respective comparators 48 and 49. Respective signals FEGO1S and FEGO2S are thereby generated. Both signal FEGO1S and signal FEGO2S are two-state signals having a predetermined high voltage when exhaust gases are rich of stoichiometry and a predetermined low voltage when exhaust gases are lean of stoichiometry.

Another conventional exhaust gas oxygen sensor (50) is shown coupled to the engine exhaust downstream of catalytic converter 52, sensor 50 provides signal REGO to controller 10 which is related to oxygen content in the exhaust gases. Output signal REGO is also compared to a reference value associated with its midpoint to provide two-state output signal REGOS to controller 10. Signal REGOS is a preselected high voltage when exhaust gas downstream of catalytic converter 50 are rich of stoichiometry and a low selected voltage when such exhaust gases are lean of stoichiometry.

Intake manifold 58 and intake manifold 59 are respectively coupled to the right hand cylinder bank and left hand cylinder bank of engine 28 and are also shown communicating with respective throttle body 60 and throttle body 61. Each throttle body in turn is shown connected to single air intake 64. Throttle plate 62 and mass air flow sensor 32 are shown coupled to air intake 64.

Continuing with FIG. 1, conventional electronic fuel injectors 76 and 77 are shown coupled to respective throttle body 60 and throttle body 61. Fuel injectors 76 delivers fuel in response in proportion to the pulse width of signal fpwl from controller 10 via one of the conventional electronic drivers 18. Similarly, fuel injector 77 delivers fuel in proportion to the pulse width of signal fpw2 from controller 10 via one of the electronic drivers 18. Fuel is delivered to fuel injectors 76 and 77 by a conventional fuel system including fuel tank 80, fuel pump 82, and fuel rail 84.

Those skilled in the art will recognize that although a central fuel injected (CFI) system is shown for each cylinder bank, the invention claimed herein is also applicable to cylinder banks having a separate fuel injector for each cylinder.

Figure 2:
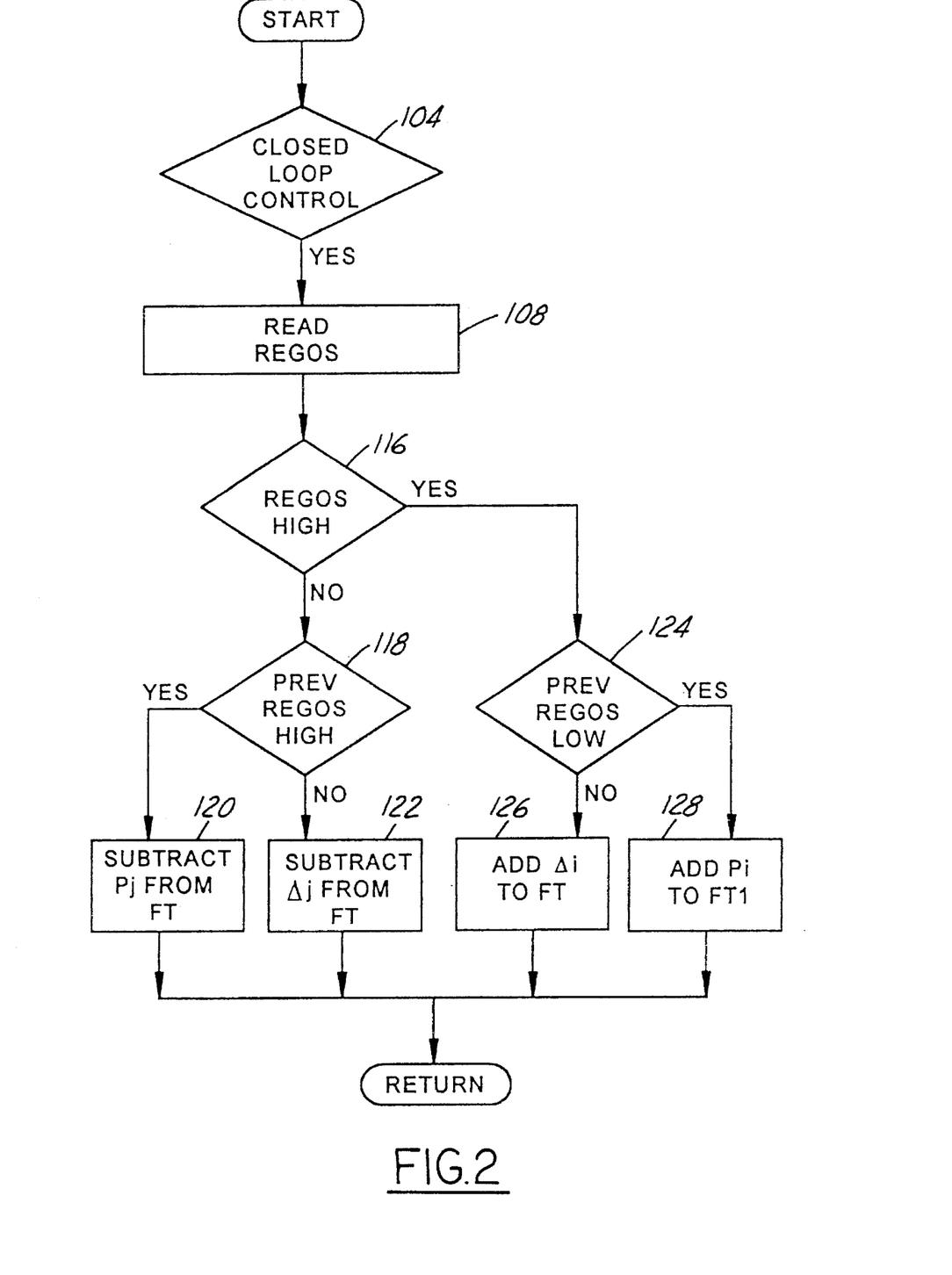
FIGS. 2, 3A–3B, 4A–4B, 5A–5B, 6A–6B and 7A–7B are high level flow charts of various operations performed by a portion of the embodiment shown in FIG. 1.

Referring now to FIG. 2, a flow chart of a routine performed by controller 10 to generate fuel trim signal FT is now described. The routine is entered after closed loop air/fuel control is commenced (step 104) in response to preselected engine operating conditions such as temperature. When closed loop control commences, signal REGOS is read from comparator 54 (step 108) and subsequently processed in the proportional plus integral control described below.

When signal REGOS is low (step 116), but was high during the previous background loop of controller 10 (step 118), preselected proportional term Pj is subtracted from fuel trim signal FT (step 120). When signal REGOS is low (step 116), and was also low during the previous background loop (step 118), preselected integral term Δj, is subtracted from fuel trim signal FT (step 122).

Similarly, when signal REGOS is high (step 116), and was also high during the previous background loop of controller 10 (step 124), integral term Δj, is added to fuel trim signal FT (step 126). When signal REGOS is high, (step 116), but was low during the previous background loop (step 124), proportional term Pi is added to fuel trim signal FT (step 128).

In accordance with the above described operation, fuel trim signal FT is generated from a proportional plus integral controller responsive to exhaust gas oxygen sensor 52. The integration steps for integrating signal REGOS in a direction to cause a lean air/fuel correction are provided by integration steps Δi, and the proportional term for such correction provided by Pi. Summarily, integral term Δj and proportional term Pj cause rich air/fuel corrections.

A separate fuel delivering and fuel adjusting routine is executed by controller 10 for both the left hand cylinder bank and the right hand cylinder bank. Referring first to the right hand cylinder bank and corresponding FIGS. 3A–3B, an open loop fuel quantity is first determined by dividing the measurement of inducted mass air flow (MAF) by desired air/fuel ratio AFd which is typically the stoichiometric value for gasoline combustion (step 158r). This open loop fuel charge is then adjusted, in this example divided, by feedback variable FV1. The resulting desired quantity of fuel, expressed as signal Fd1, is then converted into corresponding pulse width signal fpw1 (step 159r).

Figure 3A:
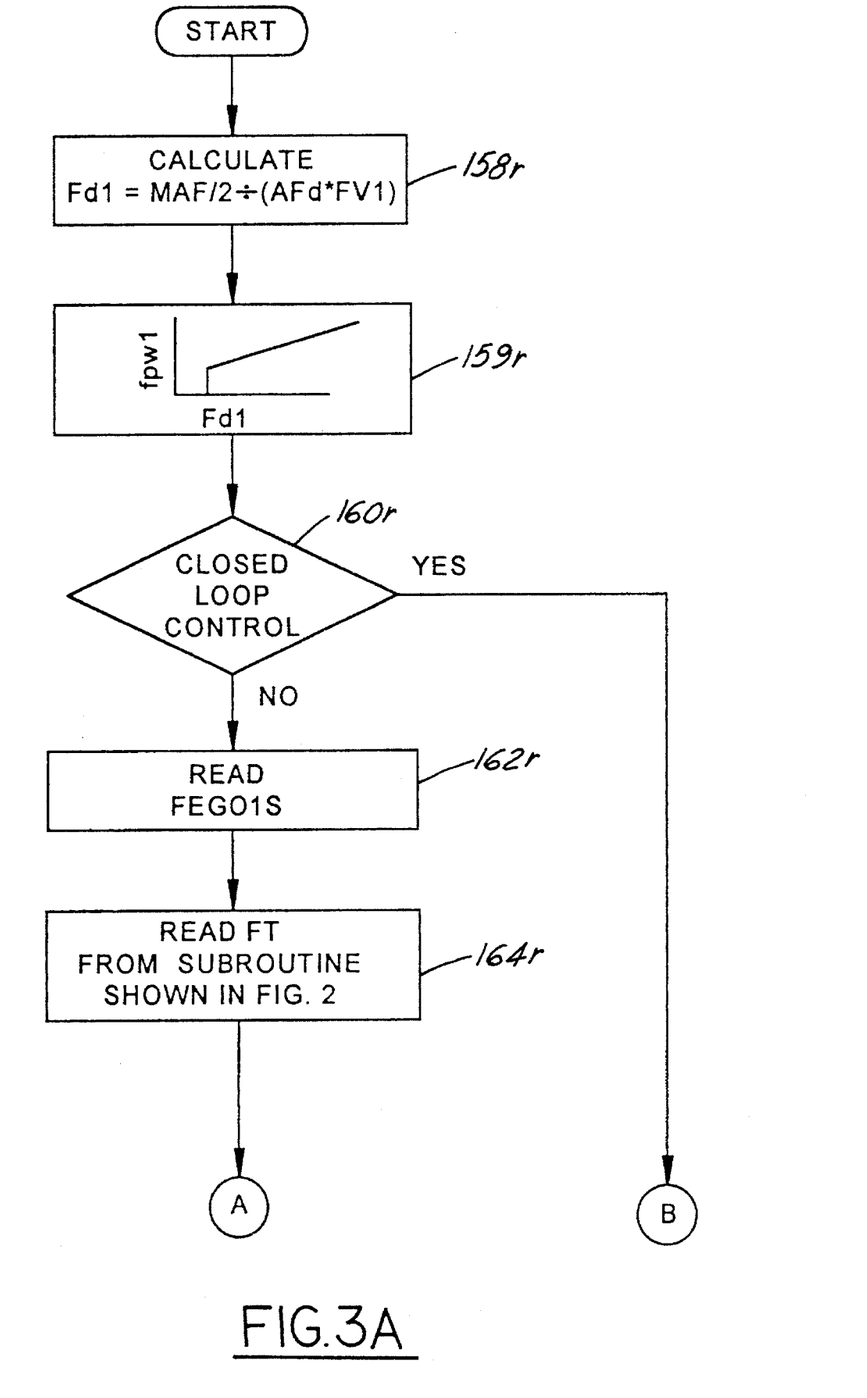
Figure 3B:
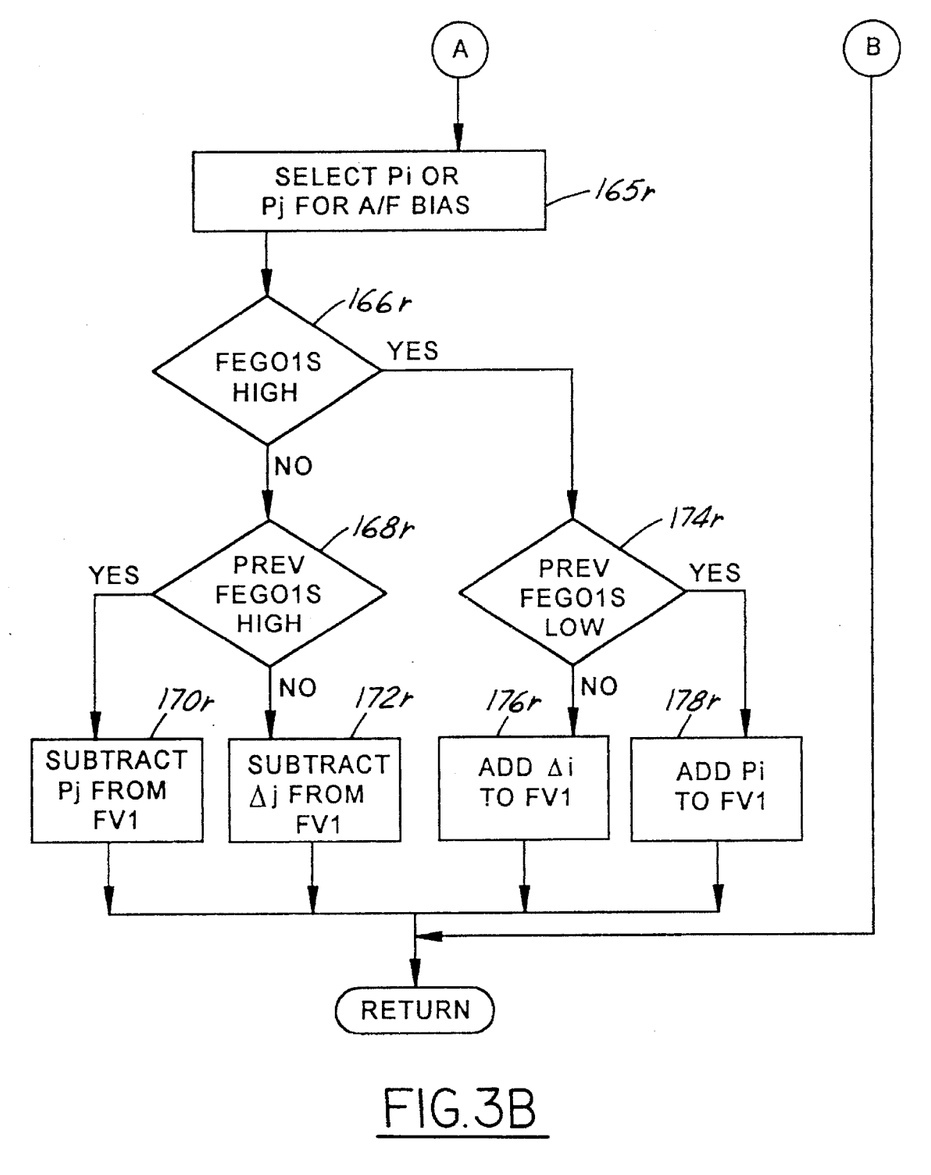

After determining that closed loop control is desired (step 160r), by monitoring engine operating conditions such as temperature (T), signal FEGO1S is read during step 162r. During step 164r, fuel trim signal FT is transferred from the routine previously described with reference to FIG. 2.

A conventional proportional plus integral feedback control routine is now executed during steps 165r–178r. Proportional term Pi or proportional term Pj are selected for achieving the desired air/fuel biasing indicated by fuel trim signal FT (step 165r). For example, in the event a lean air/fuel bias is required, proportional term Pi is increased. Conversely, if a rich air/fuel bias is required, proportional term Pj is increased in proportion to fuel trim signal FT. Those skilled in the art will recognize that air fuel biases may also be achieved by decreasing the proportional terms, increasing the integral terms, or decreasing the integral terms by an amount necessary to achieve the air/fuel bias.

When signal FEGO1S is low (step 166r), but was high during the previous background loop of controller 10 (step 168r), preselected proportional term Pj is subtracted from feedback variable FV1 (step 170r). When signal FEGO1S is low, (step 166r), and was also low during the previous background loop (step 168r), preselected integral term Δj is subtracted from feedback variable FV1 (step 172r).

Integral term Δj is added to feedback variable FV1 (step 176r), when signal FEGO1S is high (step 166r), and was also high during the previous background loop of controller 10 (step 174r). When signal FEGO1S is high (step 166r), but was low during the previous background loop (step 174r), proportional term Pi is added to feedback variable FV1 (step 178r).

In accordance with the above-described operation, feedback variable FV1 is generated from the proportional plus integral controller (PI) responsive to two-state signal FEGO1S derived from upstream exhaust gas oxygen sensor 44.

Figure 4A:
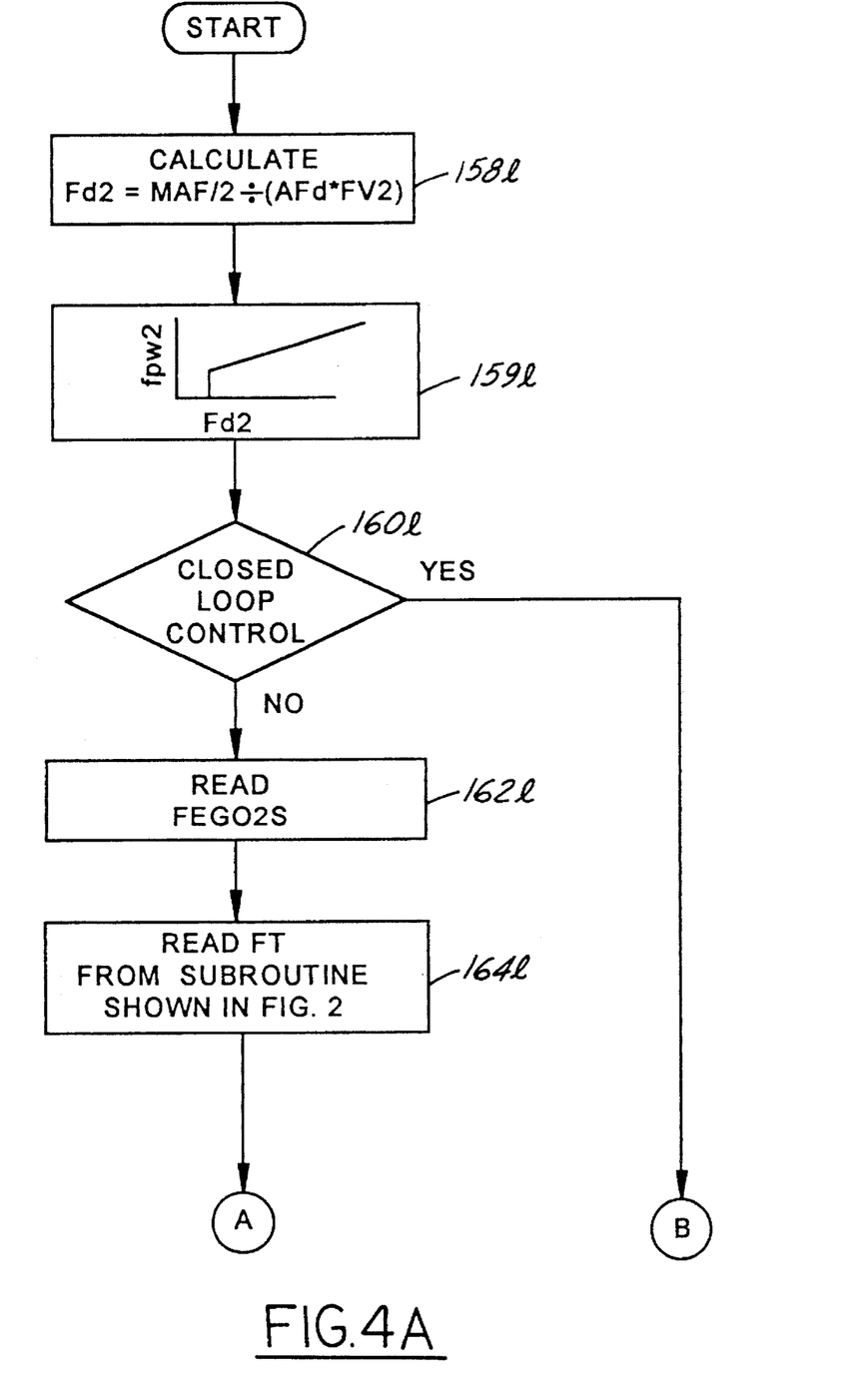
Figure 4B:
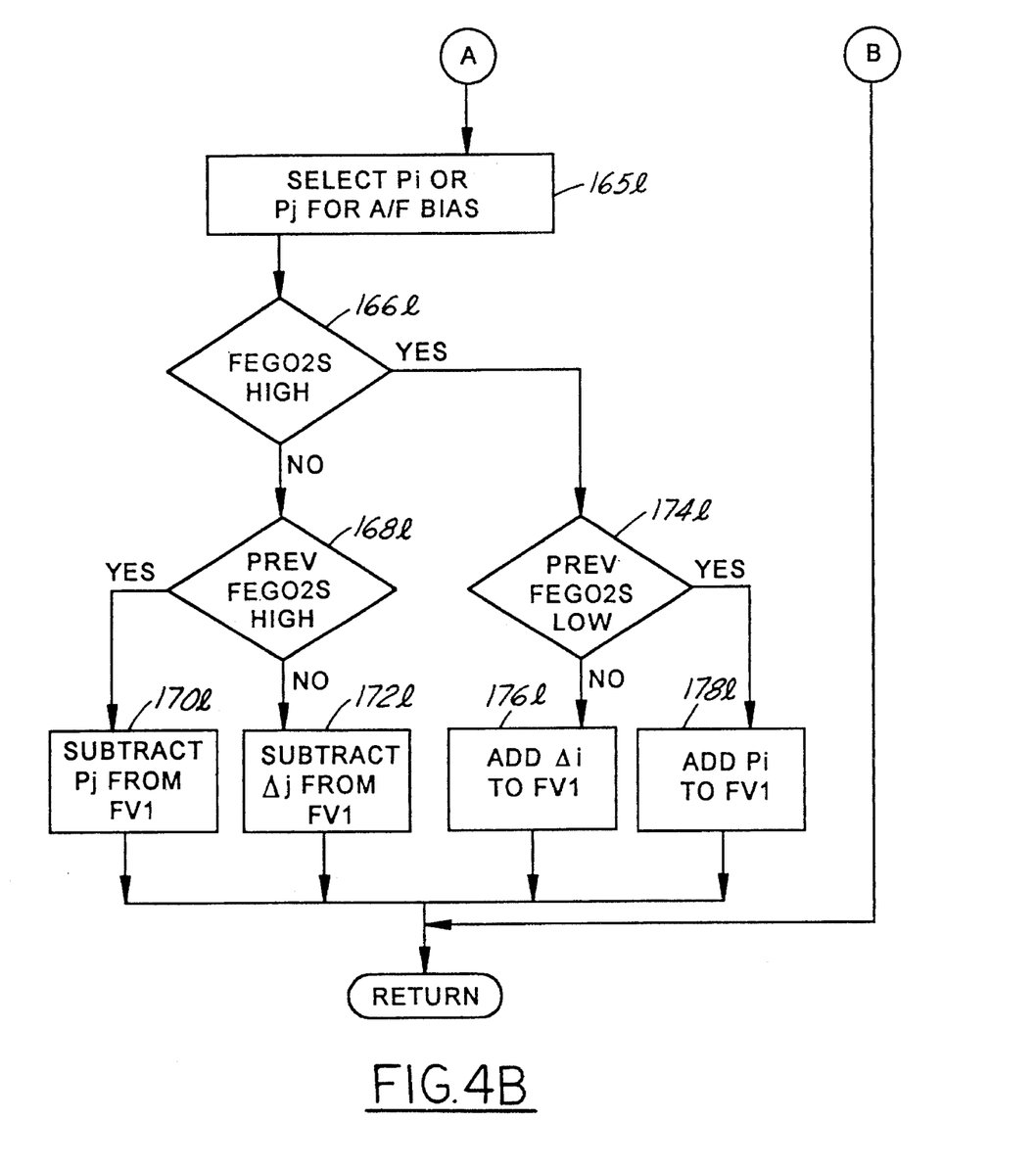

Substantially similar operations are performed by controller 10 to: generate the desired quantity of liquid fuel delivered to engine 28 (fuel signal Fd2 and pulse width signal fpw2); and trim the desired fuel quantity by feedback variable FV2 which is related to both two-state signal FEGOIS and fuel trim signal FT. The routines executed by controller 10 for delivering fuel to left intake manifold 59 is described in process steps 158L–178L shown in FIGS. 4A–4B. These process steps are substantially the same as those previously described with respect to delivering fuel to right hand intake manifold 58 with particular reference to FIGS. 3A–3B wherein like numerals refer to like process steps and like components.

Figure 5A:
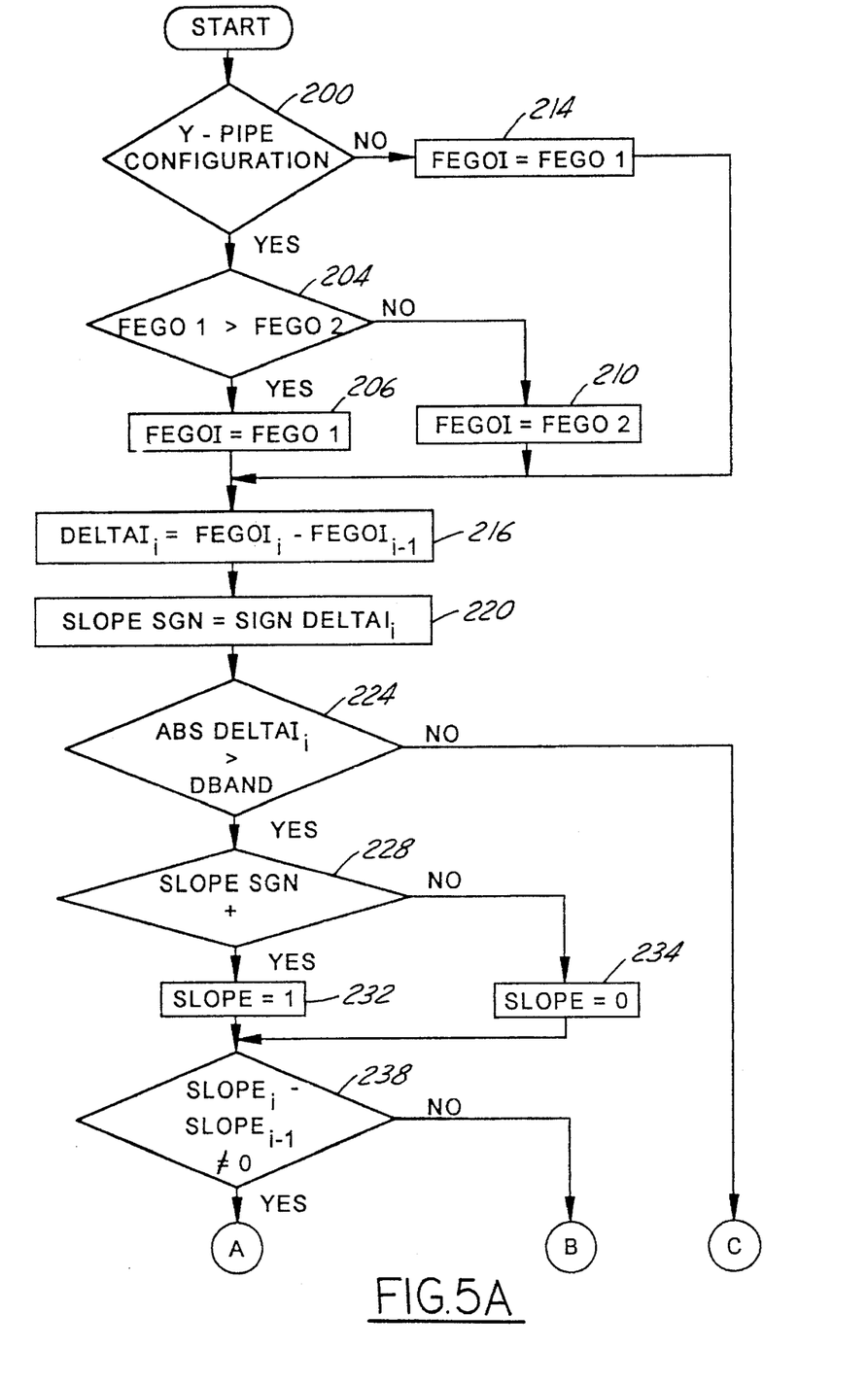
Figure 5B:
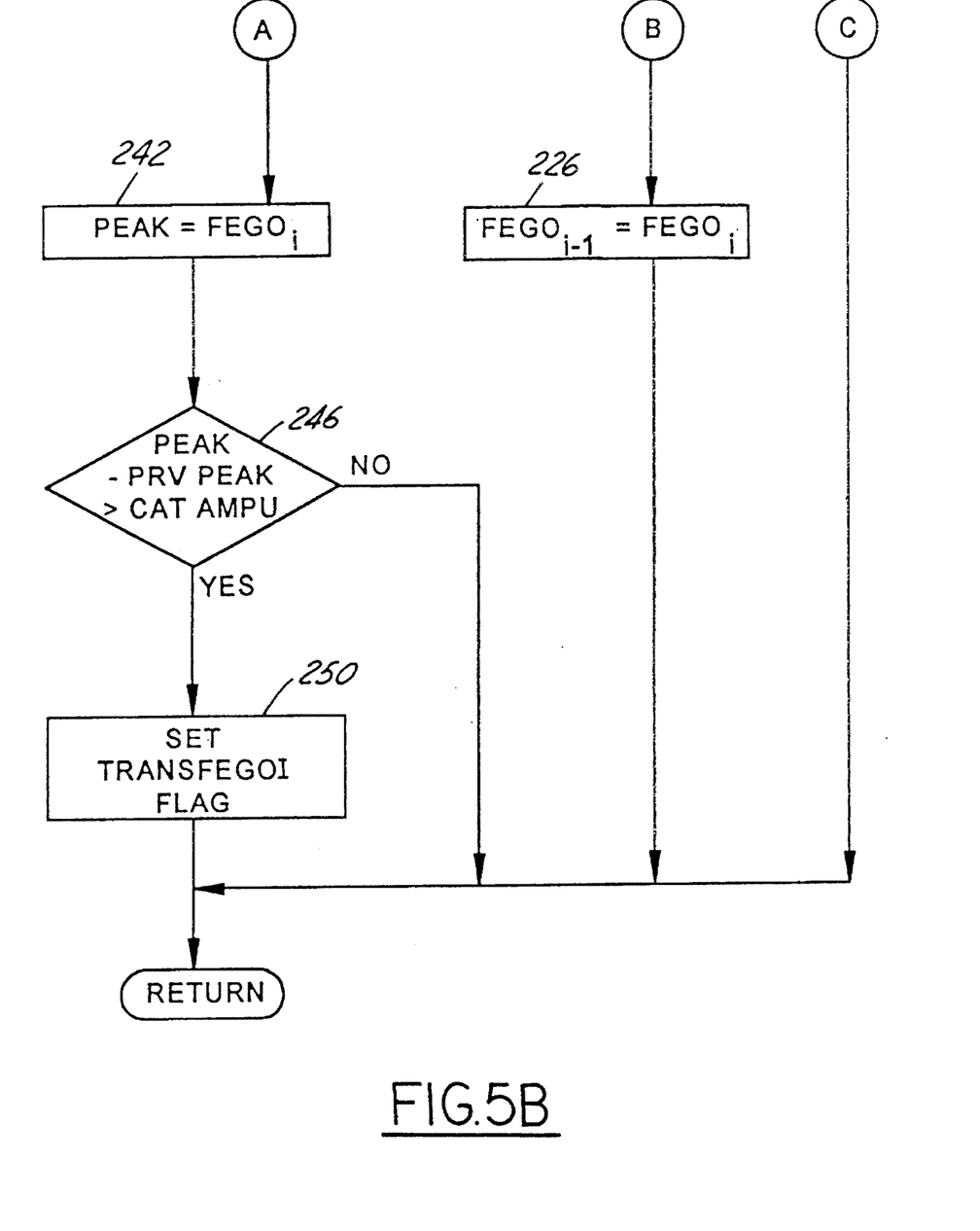

Referring now to FIGS. 5A–5B, the routine for indicating transitions in the output of the upstream exhaust gas oxygen sensors are now provided. In this particular example in which a Y-pipe exhaust manifold is coupled to a single catalytic converter, and inferred upstream signal is generated (FEGOI). Inferred upstream signal FEGOI corresponds to a hypothetical single exhaust gas oxygen sensor positioned upstream of converter 50. The routine described herein is also applicable to a single exhaust gas oxygen sensor positioned upstream of converter 50.

Referring to the particular subroutine shown in FIGS. 5A–5B, inferred signal FEGOI is set equal to output voltage amplitude FEGO1 from sensor 44 (step 214), when signal FEGO1 is greater than signal FEGO2 (step 204) and a Y-pipe exhaust manifold configuration is utilized (step 200). In the event output voltage FEGO2 from sensor 55 is greater than output voltage FEGO1 (step 204), inferred signal FEGO1 is set equal to output voltage FEG02 (step 210). In the event a Y-pipe exhaust manifold configuration is not used (step 200), inferred signal FEGOI is set equal to the output voltage of the single exhaust gas oxygen sensor (sensor 44 in this particular example) as shown in step 214.

During step 216, the difference between inferred signal $FEGOI_i$ during the present background loop (i) of controller 10 and inferred signal $FEGOI_{i-1}$ from the previous background loop (i-1) is taken to generate signal $DELTAI_i$. The sign of signal $DELTAI_i$ is stored as signal SLOPESGN during step 220. When the absolute value of signal $DELTAI_i$ is less than deadband value DBAND (224), inferred signal $FEGOI_{i-1}$ from the preceding background loop continues to be stored as signal $FEGOI_i$ for this background loop (step 226) and the subroutine exited during step 220.

If the absolute value of signal $DELTAI_i$ is greater than deadband value DBAND (224) and the slope of signal $DELTAI_i$ is positive (228), signal SLOPE is set equal to "1" (232). Signal SLOPE is set equal to "0" (234) when the slope of signal $DELTAI_i$ is negative (228) and the absolute value of signal $DELTAI_i$ is less than deadband value DBAND (224).

When the slope of signal $DELTAI_i$ changes sign between two successive background loops of controller 10 (238), inferred signal $FEGOI_i$ is stored as a peak value (signal PEAK) during the present background loop (i) as shown in step 242.

When the difference between present signal PEAK and previously stored peak value (signal PRVPEAK) exceeds calibratible value CATAMPU (246), transition flag TRANSFEGOI for inferred signal FEGOI is set during step 250 and this routine exited.

Figure 6A:
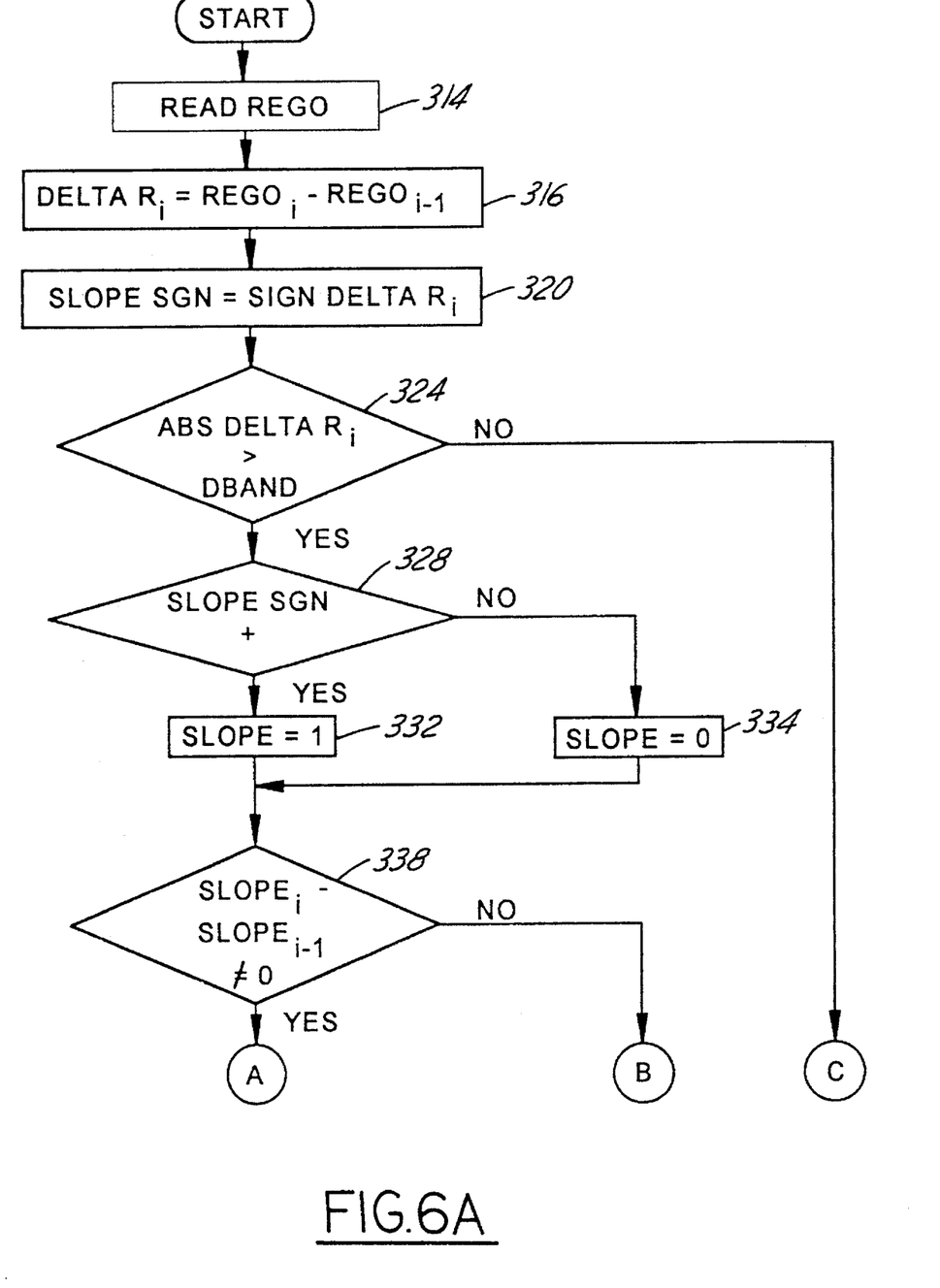
Figure 6B:
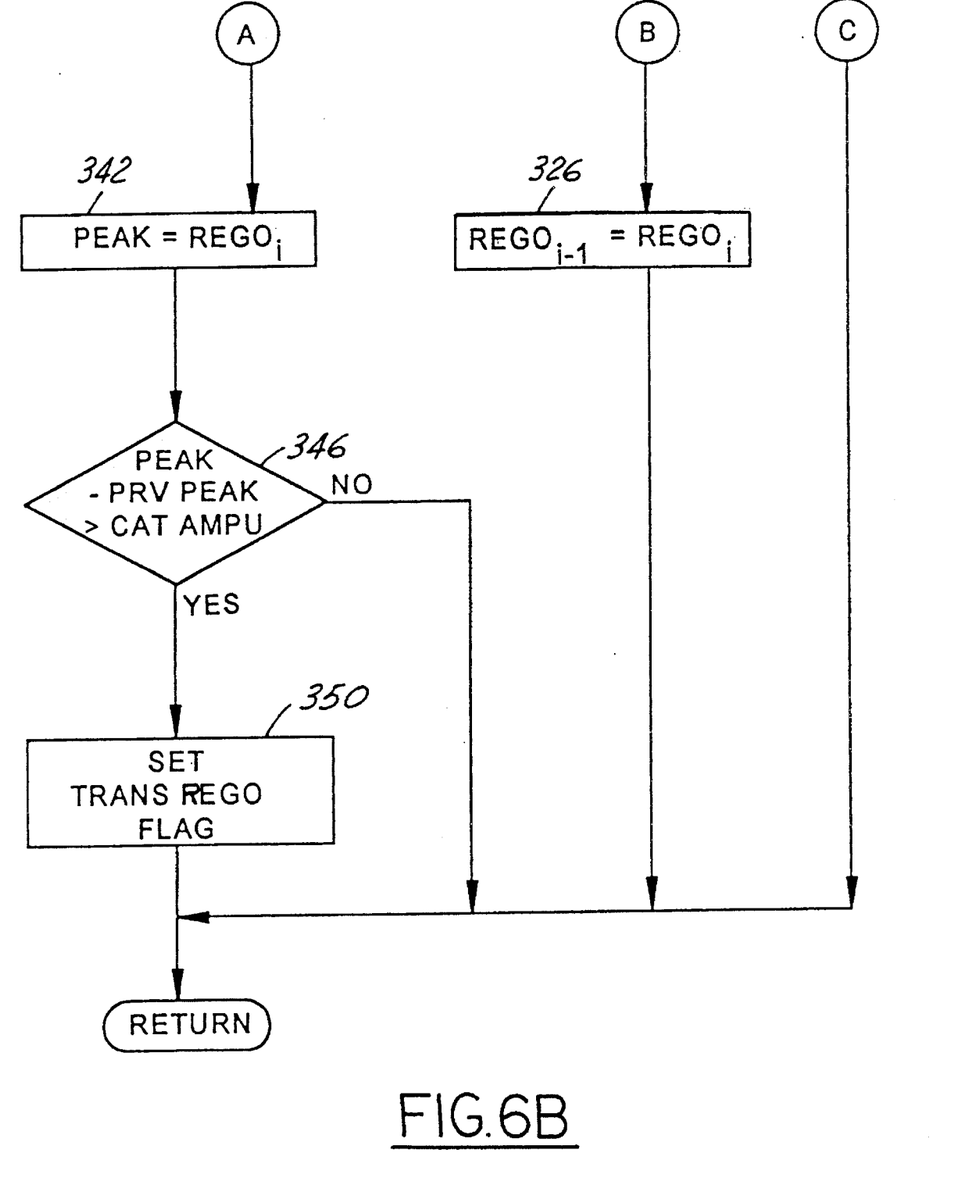

The subroutine for detecting transitions in the output amplitude of signal REGO from sensor 52 is now described with reference to the subroutine shown in FIG. 6A–6B.

The output amplitude of signal REGO is read during step 314. During step 316, the difference between signal $REGO_i$ during the present background loop (i) of controller 10 and signal $REGO_{i-1}$ from the previous background loop (i-1) is taken to generate signal $DELTAR_i$. The sign of signal $DELTAR_i$ is stored as signal SLOPESGN during step 320. When the absolute value of signal $DELTAR_i$ is less than deadband value DBAND (323), signal $REGO_{i-1}$ from the preceding background loop continues to be stored as signal $REGO_i$ for this background loop (step 326) and the subroutine exited during step 320.

If the absolute value of signal $DELTAR_i$ is greater than deadband value DBAND (324) and the slope of signal $DELTAR_i$ is positive (328), signal SLOPE is set equal to "1" (332). Signal SLOPE is set equal to "0" (334) when the slope of signal $DELTAR_i$ is negative (328) and the absolute value of signal $DELTAR_i$ is less than deadband value DBAND (324).

When the slope of signal $DELTAR_i$ changes sign between two successive background loops of controller 10 (338), signal $REGO_i$ is stored as a peak value (signal PEAK) during the present background loop (i) as shown in step 342.

When the difference between present signal PEAK and previously stored peak value (signal PRVPEAK) exceeds calibratible value CATAMPU (346), transition flag TRANSREGO for signal REGO is set during step 350 and this routine exited.

Figure 7A:
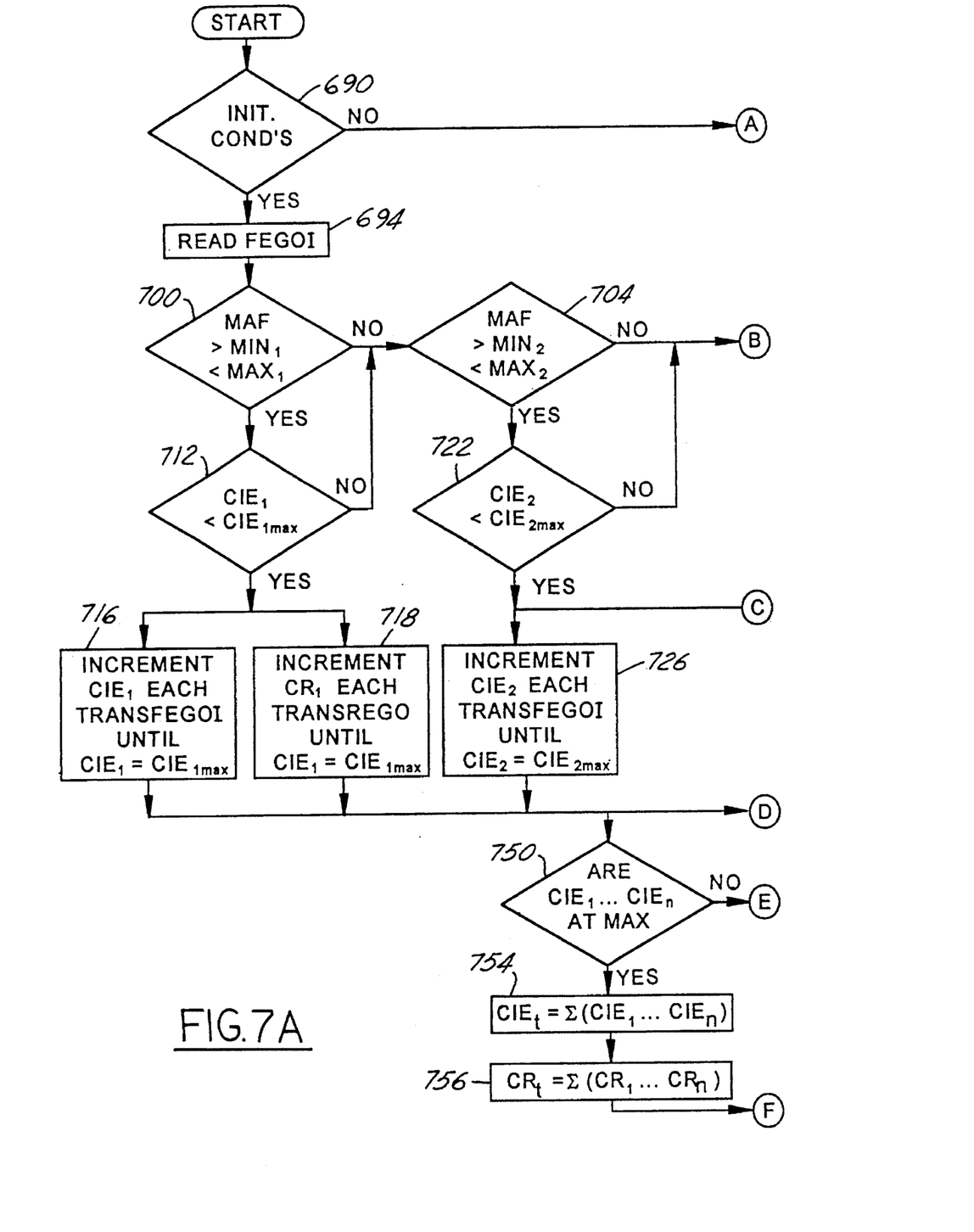
Figure 7B:
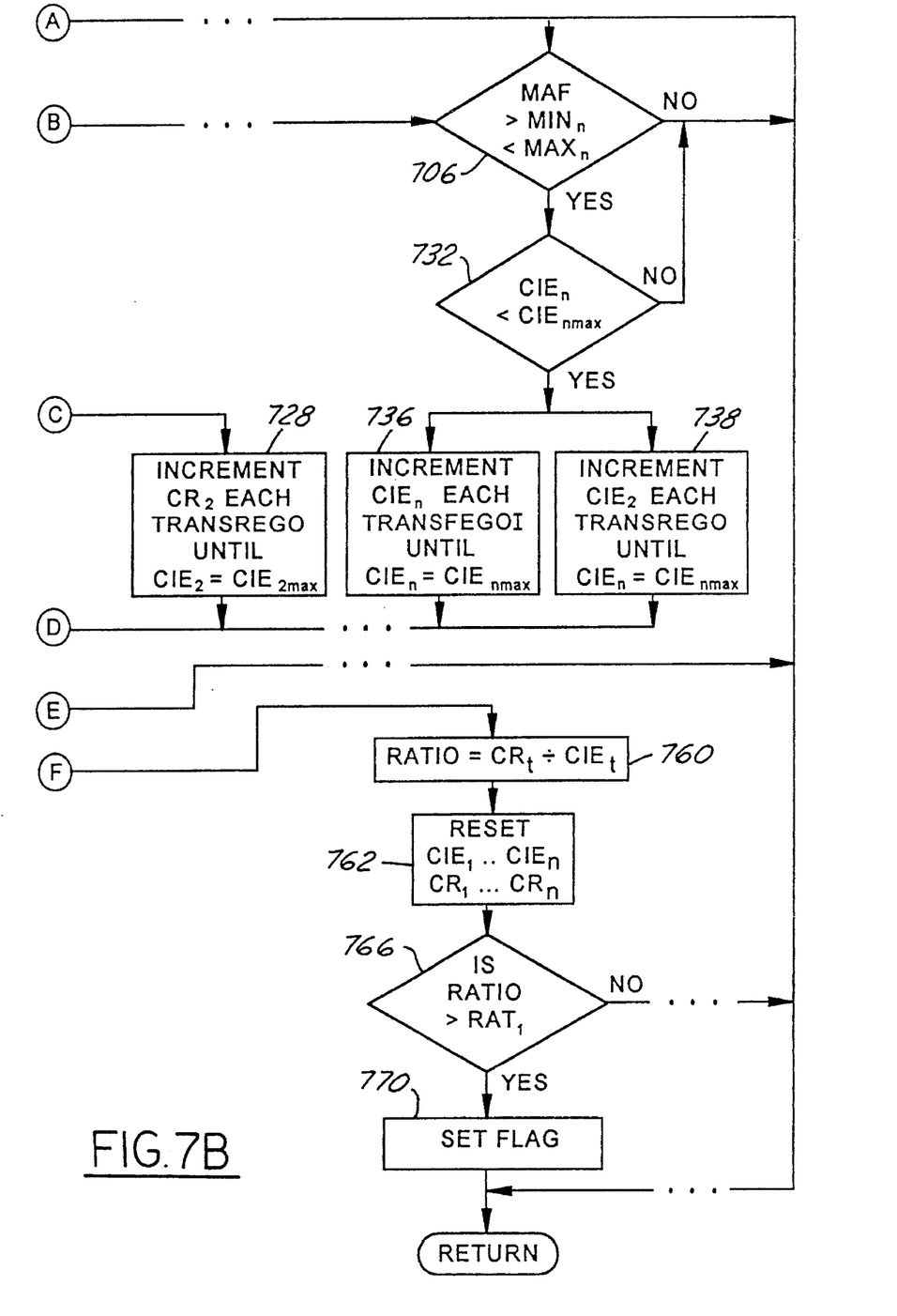

An example of indicating converter efficiency is now described with particular reference to the flow charts shown in FIGS. 7A–7B. During step 690, initial engine conditions are checked before entering the test cycle described below. More specifically, engine temperature (T) should be within a predetermined range, a predetermined time should have elapsed since the engine was started, and closed loop air/fuel control should have been operable for at least a preselected time.

For each background loop, inferred signal FEGOI is read (step 594) from the subroutine previously described with reference to FIGS. 5A–5B. Inferred signal FEGOI is an inference of an output from a hypothetical exhaust gas oxygen sensor exposed to a hypothetical blended mixture of exhaust gases from right hand exhaust manifold 56 and left hand exhaust manifold 57.

Continuing with FIGS. 7A–7B, the inducted air flow range in which engine 28 is operating is determined during steps 700, 704, and 706. These ranges are described as range (1), range (2), and range (n) for this particular example wherein "n" inducted air flow ranges are used to advantage. Assuming engine operation is within air flow range (1), transitions between states of inferred signal FEGOI are counted to generate count signal $CIE_1$. This count is compared to maximum count $CIE_{1max}$ during step 712. While engine operation remains within air flow range (1), a test period of predetermined duration is generated by incrementing count $CIE_1$ each transition of signal FEGOI until count $CIE_1$ is equal to maximum count $CIE_{1max}$ (step 716). During this test period (1), which is a subtest period of the test period for converter efficiency, count $CR_1$ is incremented each transition of signal REGOS (step 718). Stated another way, count $CR_1$ is increment each transition of signal REGOS until count $CIE_1$ equals $CIE_{1max}$.

When engine operation is within air flow range (2) as shown in step 704, count $CIE_2$ and count $CR_2$ are determined in steps 722, 726, and 728 in a manner similar to that described above for air flow range (1) with respect to steps 712, 716, and 718. Each transition of signal FEGOI, count $CIE_2$ is incremented until it reaches maximum count $CIE_{2max}$ (step 722). Predetermined subtest period (2) is thereby defined. During test period (2), count $CR_2$ is incremented each transition of signal REGOS (step 728).

The above described operation occurs for each air flow range comprising the test period. When engine 28 is operating within the highest air flow range (n) for the test period, as shown in step 706, subtest period (n), count $CIE_n$, and count $CR_n$ are generated as shown in step 732, 736, and 738.

During step 750, a determination is made as to whether engine 28 has operated in all air flow ranges (1 ... n) for respective subtest periods (1 ... n) of the converter test period. Stated another way, step 750 determines when each count of transitions in signal IE ($CIE_1$ ... $CIE_n$) have reached their respective maximum values ($CIE_{1max}$ ... $CIE_{nmax}$). Each count of transitions in signal IE ($CIE_1$ ... $CIE_n$) for respective test periods (1 ... n) are summed in step 754 to generate total count $CIE_t$. For reasons described above, the same total count $CIE_t$ may be obtained by summing each maximum count ($CIE_{1max}$ ... $CIE_{nmax}$) for respective test periods (1 ... n).

Total count $CR_t$ is generated in step 756 by summing each count ($CR_1$ ... $CR_n$) for respective test periods (1 ... n). A Ratio of total counts $CR_t$ to total count $CIE_t$ is then calculated during step 760 and all counts subsequently reset in step 762. If the calculated ratio is greater than a preselected reference ratio ($RAT_f$), a flag is set (steps 766 and 770) indicating that converter efficiency is below a preselected limit.

The actual ratio calculated from step 766 may be used to provide a measurement of converter efficiency. Due to the advantages described previously herein, this indication of converter efficiency is accurate over a wider range of converter efficiencies than heretofore possible.

An example of operation has been presented wherein both upstream sensors 44 and 55 were positioned in a Y-pipe exhaust and a single inferred signal generated from both sensors. The invention claimed herein, however, may be used to advantage with other exhaust configurations such as those employing single sensors. Other modifications will become apparent to those skilled in the art without departing from the spirit and scope of the invention claimed herein. Accordingly, the inventors herein intend that the invention be defined only by the following claims.

What is claimed:

1. A control method for an engine having its exhaust coupled to a catalytic converter, comprising the steps of:

detecting changes in gradient of output amplitude from a downstream exhaust gas oxygen sensor positioned downstream of the converter;

providing a downstream switch indication whenever a difference between a first of said output amplitudes of said downstream sensor occurring at a first of said changes in said gradient and a subsequent second of said changes of said output amplitudes of said downstream sensor occurring at a second of said changes in said gradient exceeds a predetermined value; and indicating catalytic efficiency from a ratio of counts of said downstream switch indications to a ratio of counts in transitions of an upstream signal derived from at least one upstream exhaust gas oxygen sensor positioned upstream of the converter.

2. The control method recited in claim 1 further comprising the steps of: generating a downstream two-state signal by comparing a reference value to downstream sensor output amplitude; and adjusting fuel delivered to the engine with a correction signal derived from said downstream two-state signal.

3. The control method recited in claim 2 further comprising the steps of: generating an upstream two-state signal by comparing a reference amplitude to output amplitude of said upstream exhaust gas oxygen sensor; and further correcting said delivered fuel by a feedback variable derived from said upstream two-state signal.

4. The control method recited in claim 3 wherein said upstream signal is said upstream sensor output amplitude.

5. The method recited in claim 4 wherein said correction signal adjusts said fuel delivered by biasing said feedback variable.

6. The control method recited in claim 4 wherein said upstream transitions are generated whenever a difference between a first of said upstream sensor output amplitudes occurring at a first of said gradient changes and a subsequent second of said upstream sensor output amplitudes occurring at a second change in gradient of said upstream sensor output amplitudes exceeds a preselected difference.

7. The control method recited in claim 2 wherein said upstream signal is inferred from the output of a first upstream exhaust gas oxygen sensor and a second upstream exhaust gas oxygen sensor, both being positioned upstream of the converter.

8. The control method recited in claim 7 wherein said upstream signal is set equal to said first sensor output when said first sensor output is greater than said second sensor output and is set equal to said second sensor output when said second sensor output is greater than said first sensor output.

9. A control method for an engine having its exhaust coupled to a catalytic converter, comprising the steps of:

delivering fuel to the engine in proportion to a fuel signal;

adjusting said fuel signal with a feedback variable derived from a comparison of a reference amplitude to output amplitude of an upstream exhaust gas oxygen sensor positioned upstream of the converter;

biasing said fuel signal in relation to a biasing signal derived from a comparison of a reference value to an output amplitude of a downstream exhaust gas oxygen sensor positioned downstream of the converter;

generating a difference in amplitude of said downstream sensor output amplitude between two successive sample periods;

storing downstream sensor output amplitude as a peak amplitude each sample period when said downstream sensor amplitude difference changes signs thereby providing a stored peak value;

indicating a downstream sensor transition when said downstream sensor difference changes signs and a difference between said stored peak value and said stored peak value stored during a previous change in said sign of said downstream sensor amplitude exceeds a predetermined value; and indicating converter efficiency from a ratio of transitions of said downstream sensor transitions to transitions of an upstream signal derived from said upstream sensor output amplitude.

10. The control method recited in claim 9 further comprising the steps of adjusting said predetermined value in relation to an average of said difference between stored peak values.

11. The control method recited in claim 9 further comprising the steps of:

generating a difference in amplitude of said upstream signal each sample period;

storing said upstream signal as a peak amplitude each sample period when said upstream signal amplitude difference changes sign; and indicating an upstream signal transition when said upstream signal difference changes sign and a difference between said stored peak value and said stored peak value stored during a previous change in said sign of said upstream signal exceeds a preselected value.

12. The control method recited in claim 9 wherein said upstream signal is inferred from both said upstream sensor output and from a second exhaust gas oxygen sensor positioned upstream of the converter.

13. The control method recited in claim 9 wherein said upstream signal is equal to said upstream sensor output amplitude.

14. A control system for an engine having its exhaust coupled to a catalytic converter, comprising:

a fuel controller generating a downstream two-state signal by comparing a reference value to a downstream exhaust gas oxygen sensor positioned downstream of the converter and adjusting fuel delivered to the engine with a correction signal derived from said downstream two-state signal;

processing means for detecting changes in gradient of said downstream sensor output amplitude thereby providing gradient change, said processing means providing a downstream switch indication whenever a difference between a first of said downstream sensor output amplitudes occurring at a first of said gradient changes and a subsequent second of said downstream sensor output amplitudes occurring at a second of said gradient changes exceeds a predetermined value; and indicating means for indicating catalytic efficiency from a ratio of counts of said downstream switch indications to a ratio of counts in transitions of an upstream signal derived from at least one upstream exhaust gas oxygen sensor positioned upstream of the converter.

15. The control system recited in claim 14 wherein said fuel controller further adjust said delivered fuel in response to a feedback variable derived from said upstream sensor.

* * * * *